United States Patent [19]

Kishimoto et al.

[11] Patent Number: 5,047,290

[45] Date of Patent: Sep. 10, 1991

[54] MAGNETIC RECORDING MEDIUM

[75] Inventors: Mikio Kishimoto; Shin'ichi Kitahata, both of Osaka, Japan

[73] Assignee: Hitachi Maxell, Ltd., Osaka, Japan

[21] Appl. No.: 250,409

[22] Filed: Sep. 28, 1988

[30] Foreign Application Priority Data

Oct. 1, 1987 [JP] Japan ................. 62-249361

[51] Int. Cl.$^5$ ............................................. G11B 23/00
[52] U.S. Cl. .................................. 428/323; 428/329; 428/694; 428/900
[58] Field of Search ............... 428/329, 694, 900, 323; 252/62.63, 62.59, 62.56

[56] References Cited

U.S. PATENT DOCUMENTS

| | | |
|---|---|---|
| 4,666,770 | 5/1987 | Asai et al. |
| 4,789,494 | 12/1988 | Aoki et al. ........................ 252/62.59 |
| 4,820,433 | 4/1989 | Yamamoto ........................ 252/62.56 |
| 4,851,292 | 7/1989 | Nagai et al. ........................ 252/62.56 |

FOREIGN PATENT DOCUMENTS 62-71026  4/1987  Japan .

Primary Examiner—Paul J. Thibodeau
Attorney, Agent, or Firm—Birch, Stewart, Kolasch & Birch

[57] ABSTRACT

A magnetic recording medium which comprises a substrate and a magnetic layer comprising a hexagonal system barium ferrite powder of the formula:

$$BaO.n[Fe_{2-(a+b+c+d)}Co_aNi_bZn_cTi_dO_{3+e}] \qquad (I)$$

wherein n is a number of 5.5 to 6.0, a through d are each a number of 0.01 to 0.2 and satisfy the equation:

$$(a+b+c)/d = 1 \text{ to } 10$$

and e is a number of $-0.3$ to 0.01, and a non-magnetic particulate powder having a Mohs' hardness of not smaller than 7 in an amount of 1 to 30% by weight based on the weight of said ferrite powder, in which demagnetization by cooling is suppressed.

4 Claims, No Drawings

MAGNETIC RECORDING MEDIUM

BACKGROUND OF THE INVENTION

1. Field of the Invention

The present invention relates to a magnetic recording medium. More particularly, the present invention relates to a magnetic recording medium such as a magnetic tape and a magnetic disc comprising a hexagonal system barium ferrite powder as a recording element.

2. Description of the Related Art

Requirement for high density recording of a magnetic recording medium increases year by year. A horizontal recording medium in which acicular magnetic powder is oriented in a magnetic layer has such a disadvantage that rotational demagnetization significantly increases as the recording density is increased. Recently, therefore, a vertical magnetic recording medium in which signals are recorded in a vertical direction to a magnetic layer is being developed.

As a magnetic layer formed in such a vertical magnetic recording medium, a layer which is formed by coating platelet particles of hexagonal system barium ferrite powder, with orienting the platelet surfaces in parallel to a medium surface is considered to have better properties, such as productivity and durability, than a thin metal layer consisting of magnetic metal, such as Co—Cr.

However, a conventional magnetic recording medium using the hexagonal system barium ferrite powder has a fatal disadvantage in that it has unsatisfactory storage properties since an output of recorded signals attenuates, namely so-called "demagnetization by cooling" occurs, when the recording medium is once subjected to a low temperature after signals are recorded, and then reproduced at room temperature.

In the course of research for overcoming the above disadvantage, it was found that since a coercive force of the magnetic recording medium comprising the hexagonal system ferrite powder as the recording element largely varies with temperature and usually has such temperature dependency that the coercive force is low at low temperatures and high at high temperatures, when the recording medium is kept at low temperatures after recording, the coercive force is decreased so that the output of the signals deteriorates.

SUMMARY OF THE INVENTION

An object of the present invention is to provide a magnetic recording medium comprising a hexagonal system barium ferrite powder which can greatly suppress demagnetization by cooling.

This and other objects of the present invention are accomplished by a magnetic recording medium which comprises a substrate and a magnetic layer comprising a hexagonal system barium ferrite powder of the formula:

$$BaO \cdot n[Fe_{2-(a+b+c+d)}Co_aNi_bZn_cTi_dO_{3+e}] \quad (I)$$

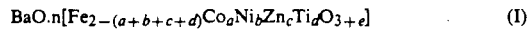

wherein n is a number of 5.5 to 6.0, a through d are each a number of 0.01 to 0.2 and satisfy the equation:

$$(a+b+c)/d = 1 \text{ to } 10 \cdot$$

and e is a number of $-0.3$ to $0.01$, and a non-magnetic particulate powder having a Mohs' hardness of not less than 7 in an amount of 1 to 30% by weight based on the weight of the ferrite powder.

DETAILED DESCRIPTION OF THE INVENTION

When the hexagonal system barium ferrite of the formula (I) is used as the recording element, temperature dependency of the coercive force is reduced and particularly, the coercive force is decreased by a smaller degree at low temperatures so that the demagnetization by cooling is greatly suppressed.

To practically utilize the ferrite powder as the recording element of the magnetic recording medium, the powder should be uniformly dispersed in a binder resin so that each particle of the powder is discretely present in the magnetic layer. Otherwise, high recording density characteristics of the ferrite powder are not sufficiently realized. From this view point, the ferrite powder was kneaded together with the binder resin to uniformly disperse the powder in the binder resin and to prepare a magnetic paint while applying high mechanical shear force, and the magnetic paint coated on the substrate to produce a magnetic recording medium. Then, recording characteristics and the temperature dependency of the coercive force of such a magnetic recording medium were examined to find that the temperature dependency of the coercive force was greatly improved, but the recording characteristics were inferior to a conventional barium ferrite in which iron elements are not substituted by other elements.

As the result of the investigation of such a phenomena, it was found that the powder particles of the barium ferrite of the formula (I) are discretely dispersed in the binder resin when the mechanical shear force is applied, but after the shear force is removed, plate surfaces of the adjacent particles stick to each other and the particles are laminated more intensely than the conventional barium ferrite in which the iron elements are not substituted by other elements.

As the result of further study to overcome such a problem of the barium ferrite powder of the formula (I), it has been concluded that the presence of inclusion of some additive would effectively prevent recoagulation of the particles after removal of the shear force. As such, a non-magnetic particulate powder having a Mohs' hardness of not less than 7 is selected and added to the magnetic layer in an amount of from 1 to 30% by weight based on the weight of the barium ferrite powder by taking the following factors into consideration:

1. The inclusion is not affected by magnetic attraction of the barium ferrite powder of the formula (I);
2. The inclusion has homogeneous performance for preventing the recoagulation of the powder particles in all directions in which the coagulation force acts;
3. A shape of the inclusion particle is not deformed by mechanical collision between the ferrite particles and the inclusion additive; and
4. The inclusion should be present in such an amount that recoagulation in the dispersion system of the ferrite powder in the binder resin is substantially prevented.

The barium ferrite of the formula (I) to be used according to the present invention is characterized in that a part of the iron elements is substituted by cobalt, nickel, zinc and titanium elements, and the amounts of these substituting elements ("a", "b", "c" and "d" in the formula (I)) are limited in a range of from 0.01 to 0.2 each and satisfy the equation: $(a+b+c)/d = 1$ to $10$.

When the barium ferrite has a chemical composition as the formula (I), not only the four substituted elements inherently act to decrease the coercive force of the barium ferrite to a level suitable as the recording element, but also the undesirable decrease of the coercive at low temperatures is suppressed. Thus, a magnetic recording medium having small demagnetization by cooling and good storage properties is obtained.

When at least one of "a" though "d" is smaller than 0.01, the coercive force of the barium ferrite is not decreased to a desired level. When it is larger than 0.2, it is difficult to keep a magnetic easy axis in a direction perpendicular to the platelet plane. When the ratio $(a+b+c)/d$ is less than 1 or greater than 10, the problem of the demagnetization by cooling cannot be solved; therefore, no hexagonal system barium ferrite powder which is suitable for high density recording and improves the storage properties of the magnetic recording medium can be obtained.

In the formula (I), "n" represents an atomic ratio of the sum of iron and the substituted elements to the barium elements and is usually in the range of from 5.5 to 6.0.

In the formula (I), "e" is so defined that the hexagonal system barium ferrite powder has a neutral charge and is theoretically a negative number which satisfies the equation: $2e = d-(a+b+c)$, although actually it may be slightly greater than zero. Therefore, "e" is from $-0.3$ to $0.1$, preferably from $-0.2$ to $0.02$.

The coercive force of the hexagonal system barium ferrite powder of the formula (I) is usually in a range of 200 to 2,000 Oe. When the coercive force is smaller than 200 Oe, the high density recording cannot be realized. When it is larger than 2,000 Oe, the barium ferrite powder is not suitable as the recording element of the magnetic recording medium. A hexagonal platelet of the barium ferrite powder preferably has an average diameter of its platelet plane of 0.02 to 0.5 μm. When the average diameter of the platelet plane is smaller than 0.02 μm, it is difficult for the barium ferrite powder to have sufficient magnetism. When it is larger than 0.5 μm, the surface smoothness of the magnetic layer is decreased so that the high density recording cannot be realized.

The hexagonal system barium ferrite powder is prepared by using a specific amount of a compound, such as a chloride, which contains each metal element (Ba, Fe, Co, Ni, Zn or Ti) of the formula (I). An aqueous solution of the compound is added to an aqueous alkaline solution and mixed to form a precipitate, which is heated at a temperature of 150° to 300° C. for 1 to 6 hours. The reaction product is washed, filtered, dried and thermally treated at a temperature of 400° to 1,000° C. for several hours so as to improve the magnetic properties.

Examples of the non-magnetic particulate powder having a Mohs' hardness of not less than 7 are $Al_2O_3$, $Cr_2O_3$, $TiO_3$, $SiO_2$, SiC, WC, BN or their composite compounds, which have an average particle size of 0.07 to 3.0 μm. Among them, $Al_2O_3$ is most preferable in view of its particle shape and uniformity of the particle size.

The content of the non-magnetic powder is from 1 to 30% by weight, preferably from 3 to 20% by weight, based on the weight of the hexagonal system barium ferrite. When this content is less than 1% by weight, the recoagulation of the barium ferrite powder is not prevented, and when it is larger than 30% by weight, the mechanical shear force is mainly applied on the non-magnetic powder in the dispersion so that the separation of the barium ferrite particles, which is a premise for the prevention of recoagulation, is hardly achieved.

When the $Al_2O_3$ powder is used as the non-magnetic particulate powder according to the present invention, its content is so selected that an amount of the aluminum element is 0.7 to 21.6% by weight based on the weight of the iron element in the hexagonal system barium ferrite powder. Outside this range, the above described problems tend to occur.

The magnetic recording medium of the present invention can be prepared, for example, by mixing and dispersing the hexagonal system barium ferrite powder and the non-magnetic particulate powder with the binder resin, an organic solvent and other additives to prepare a magnetic paint, coating the magnetic paint on a substrate such as a polyester film, with any coating means, such as a roll coater, and drying it to form a magnetic layer.

Preferably, the magnetic paint containing the hexagonal system barium ferrite powder is magnetically oriented by applying a magnetic field in a vertical direction to the magnetic layer after it is coated on the substrate, whereby magnetic easiness of the independent barium ferrite powder particle is highly attained and the magnetic easy axis is readily oriented in said vertical direction. According to the present invention, a magnetic recording medium having good magnetic properties can be produced by coating the magnetic paint in the absence of magnetic field.

The binder resin may be a conventional binder resin such as vinyl chloride/vinyl acetate copolymers, polyvinyl butyral resins, cellulose resins, polyurethane resins, isocyanate compounds and radiation-curable resins.

The organic solvent may be a conventional one such as toluene, methyl ethyl ketone, methyl isobutyl ketone, cyclohexanone, tetrahydrofuran, ethyl acetate and mixtures thereof.

The magnetic paint may include various conventional additives such as a dispersant, lubricant, abrasive or antistatic agent.

PREFERRED EMBODIMENTS

The present invention will be hereinafter explained in detail by the following examples, in which parts and % are by weight.

EXAMPLE 1

The following components were dissolved in one liter of water and mixed with one liter of a 1N aqueous solution of sodium hydroxide to prepare a precipitate:

| | |
|---|---|
| $BaCl_2.2H_2O$ | 21.3 g |
| $FeCl_3.6H_2O$ | 235.7 g |
| $CoCl_2.6H_2O$ | 16.6 g |
| $NiCl_2.6H_2O$ | 4.2 g |
| $ZnCl_2$ | 3.6 g |
| $TiCl_4$ | 11.6 g |

The precipitate was hydrothermally reacted at 300° C. for 2 hours in an autoclave. The reaction product was washed with water, filtered and dried followed by thermal treatment in the air at 500° C. for 4 hours to obtain hexagonal system barium ferrite powder. This powder was analyzed to have the formula (I) wherein n is 6.0, a is 0.133, b is 0.033, c is 0.05, d is 0.117, $(a+b+c)/d$ is 1.85 and e is $-0.050$. The powder had saturation magnetization of 54.5 emu/g and an average platelet plane diameter of 0.06 μm.

A magnetic paint was prepared by mixing the resultant barium ferrite powder with the following components in a ball mill for three days:

| Component | Parts |
| --- | --- |
| Hexagonal system barium ferrite | 1,000 |
| Vinyl chloride/vinyl acetate/vinyl alcohol copolymer (VAGH, a trade name of U.C.C., U.S.A.) | 137.5 |
| Polyurethane resin (Pandex T 5201, a trade name of Dainippon Ink Chemical Co., Japan) | 87.5 |
| Trifunctional low molecular weight isocyanate compound (Colonate L, a trade name of Nippon Polyurethane Ind., Japan) | 25 |
| $Al_2O_3$ particulate powder (Mohs' hardness of 9, average particle size of 0.5 μm) | 115 |
| Lauric acid | 20 |
| Liquid paraffin | 2 |
| Methyl isobutyl ketone | 800 |
| Toluene | 800 |

The magnetic paint was coated on a substrate of a polyester film having a thickness of 72 μm and dried to form a magnetic layer having a thickness of 3 μm. Then, the coated substrate was subjected to a smoothening treatment and cut into a magnetic disc having a desired shape.

$Al_2O_3$ was contained in the magnetic layer in such amount that aluminum was present in an amount of 8.3% based on the weight of iron in the hexagonal system barium ferrite.

EXAMPLE 2

In the same manner as in Example 1 but using 12.5 g of $CoCl_2.6H_2O$, 8.3 g of $NiCl_2.6H_2O$, 8.3 g of $ZnCl_2$ and 5.0 g of $TiCl_4$, the hexagonal system barium ferrite of the formula (I) in which n is 6.0, a is 0.1, b is 0.067, c is 0.117, d is 0.05, $(a+b+c)/d$ is 5.68 and e is $-0.117$ was prepared. The barium ferrite powder had a coercive force of 720 Oe, saturation magnetization of 59.3 emu/g and an average paltelet plane diameter of 0.06 μm. Then, the magnetic disc was produced in the same manner as in Example 1.

EXAMPLE 3

In the same manner as in Example 1 but changing the amount of particulate $Al_2O_3$ powder to 60 parts which corresponds 4.3% of aluminum based on the weight of iron in the hexagonal system barium ferrite, the magnetic disc was produced.

COMPARATIVE EXAMPLE 1

In the same manner as in Example 1 but using 12.5 g of $CoCl_2.6H_2O$, 2.4 g of $ZnCl_2$ and 17.4 g of $TiCl_4$, the hexagonal system barium ferrite of the formula (I) in which n is 6.0, a is 0.1, b is 0.033, c is 0.33, d is 0.175, $(a+b+c)/d$ is 0.95 and e is 0.005 was prepared. The barium ferrite powder had a coercive force of 730 Oe, saturation magnetization of 53.2 emu/g and an average platelet plane diameter of 0.07 μm. Then, the magnetic disc was produced in the same manner as in Example 1.

COMPARATIVE EXAMPLE 2

In the same manner as in Example 1 but using 20.8 g of $CoCl_2.6H_2O$, 16.6 g of $TiCl_4$, no $NiCl_2.6H_2O$ and no $ZnCl_2$, the hexagonal system barium ferrite of the formula (I) in which n is 6.0, a is 0.167, b is 0, c is 0, d is 0.167 and e is 0 was prepared. The barium ferrite powder had a coercive force of 710 Oe, saturation magnetization of 53.1 emu/g and an average platelet plane diameter of 0.07 μm. Then, the magnetic disc was produced in the same manner as in Example 1.

COMPARATIVE EXAMPLE 3

In the same manner as in Example 1 but changing the amount of particulate $Al_2O_3$ powder to 8 parts which corresponds 0.6% of aluminum based on the weight of iron in the hexagonal system barium ferrite, the magnetic disc was produced.

COMPARATIVE EXAMPLE 4

In the same manner as in Example 1 but changing the amount of particulate $Al_2O_3$ powder to 320 parts which corresponds 23% of aluminum based on the weight of iron in the hexagonal system barium ferrite, the magnetic disc was produced.

COMPARATIVE EXAMPLE 5

In the same manner as in Example 1 but using acicular $\alpha$-$Fe_2O_3$ having an average axial ratio of 10 and an average platelet plane diameter of 0.5 μm in place of particulate $Al_2O_3$ powder, the magnetic disc was produced.

With the magnetic discs produced in Examples and Comparative Examples, a coercive force at 20° C., decrease of residual magnetic flux density (%) after keeping the magnetic discs at $-20°$ C. or 0° C. for 2 hours, and an output/noise ratio when recording and reproducing a signals of recording wavelength of 0.7μ or 1.5 μm by using a Mn-Zn ferrite ring head having a gap width of 0.4 μm were measured. The results are show in following Table. The output/noise ratio is expressed as a relative value with that of the magnetic disc produced in Comparative Example being 0 (zero).

TABLE

| Example No. | Coercive force at 20° C. | Decrease of residual magnetic flux density (%) | | Output/noise ratio (dB) | |
| --- | --- | --- | --- | --- | --- |
| | | $-20°$ C. | 0° C. | 0.7 μm | 1.5 μm |
| 1 | 740 | 1.2 | 0.8 | +0.2 | +0.1 |
| 2 | 720 | 1.4 | 1.0 | +0.2 | 0 |
| 3 | 710 | 1.2 | 0.9 | 0 | +0.1 |
| Comp. 1 | 740 | 6.8 | 5.0 | 0 | 0 |
| Comp. 2 | 720 | 20.1 | 18.2 | $-0.1$ | $-0.1$ |
| Comp. 3 | 700 | 1.2 | 0.9 | $-2.6$ | $-1.8$ |
| Comp. 4 | 740 | 1.3 | 0.9 | $-1.6$ | $-1.0$ |
| Comp. 5 | 700 | 1.2 | 0.9 | $-3.3$ | $-2.0$ |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium which comprises a substrate and a magnetic layer comprising a binder, a hexagonal system barium ferrite powder of the formula:

$$BaO.n[Fe_{2-(a+b+c+d)}Co_aNi_bZn_cTi_dO_{3+e}] \qquad (I)$$

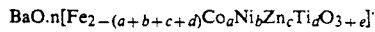

wherein n is a number of 5.5 to 6.0, a through d are each a number of 0.01 to 0.2 and satisfy the equation:

$$(a+b+c)/d = 1 \text{ to } 10$$

and e is a number of −0.3 to 0.01, having a coercive force of from 200 to 2000 Oe, and an average diameter of its platelet plane of between 0.02 to 0.05 microns, and a non-magnetic particulate powder having a Mohs' hardness of not less than 7 in an amount of from 1 to 30% by weight based on the weight of said ferrite powder.

2. The magnetic recording medium according to claim 1, wherein said non-magnetic particulate powder is selected from at least one member of the group consisting of $Al_2O_3$, $Cr_2O_3$, $TiO_3$, $SiO_2$, SiC, WC and BN.

3. The magnetic recording medium according to claim 1, wherein said non-magnetic particulate powder comprises $Al_2O_3$ contained in such an amount that an amount of the aluminum element is 0.07 to 21.6% by weight based on the weight of the iron element in the hexagonal system barium ferrite powder of the formula (I).

4. The magnetic recording medium according to claim 1, wherein the amount of said non-magnetic particulate powder is from 3 to 20% by weight based on the weight of the hexagonal system barium ferrite powder of the formula (I).

* * * * *